United States Patent [19]

Bolton et al.

[11] 4,290,866
[45] Sep. 22, 1981

[54] REMOVAL OF MANGANESE IONS FROM ZINC AND MANGANESE CONTAINING SOLUTIONS

[75] Inventors: Gerald L. Bolton, Fort Saskatchewan, Canada; Verner B. Sefton, Makati, Philippines; Nicolaus Zubryckyj, Edmonton, Canada

[73] Assignee: Sherritt Gordon Mines Limited, Toronto, Canada

[21] Appl. No.: 86,877

[22] Filed: Oct. 22, 1979

[30] Foreign Application Priority Data

Dec. 20, 1978 [GB] United Kingdom ............... 49207/78

[51] Int. Cl.³ .............................................. C25C 1/16
[52] U.S. Cl. ...................................... 204/119; 423/50
[58] Field of Search ..................... 204/119; 423/50, 52, 423/101, 102, 104

[56] References Cited

U.S. PATENT DOCUMENTS 1,331,334 2/1970 Field .................................... 423/102
4,067,789 1/1978 Harris et al. ........................ 204/119
4,071,421 1/1978 Masters et al. ...................... 204/119

FOREIGN PATENT DOCUMENTS 2025077 9/1970 France ................................. 423/50

OTHER PUBLICATIONS

"Mn", Gmelins H-Buch der Anorganischen Chemie; 1973, p. 147.
Electrodeposition of Alloys, A. Brenner, vol. II, 1963, p. 138.
"Ozone", Kirk-Othmer Encyclopedia of Chem. Technology, vol. 14, 2nd Ed., 1967, p. 415.

Primary Examiner—R. L. Andrews
Attorney, Agent, or Firm—Robert F. Delbridge; Arne I. Fors

[57] ABSTRACT

A process for removing manganese ions from aqueous acidic sulphate solutions containing zinc and manganese ions, without removing a substantial amount of zinc ions from solution, includes treating the solution with ozone to oxidize manganese ions to manganese dioxide, and removing the manganese dioxide from the solution.

5 Claims, 1 Drawing Figure

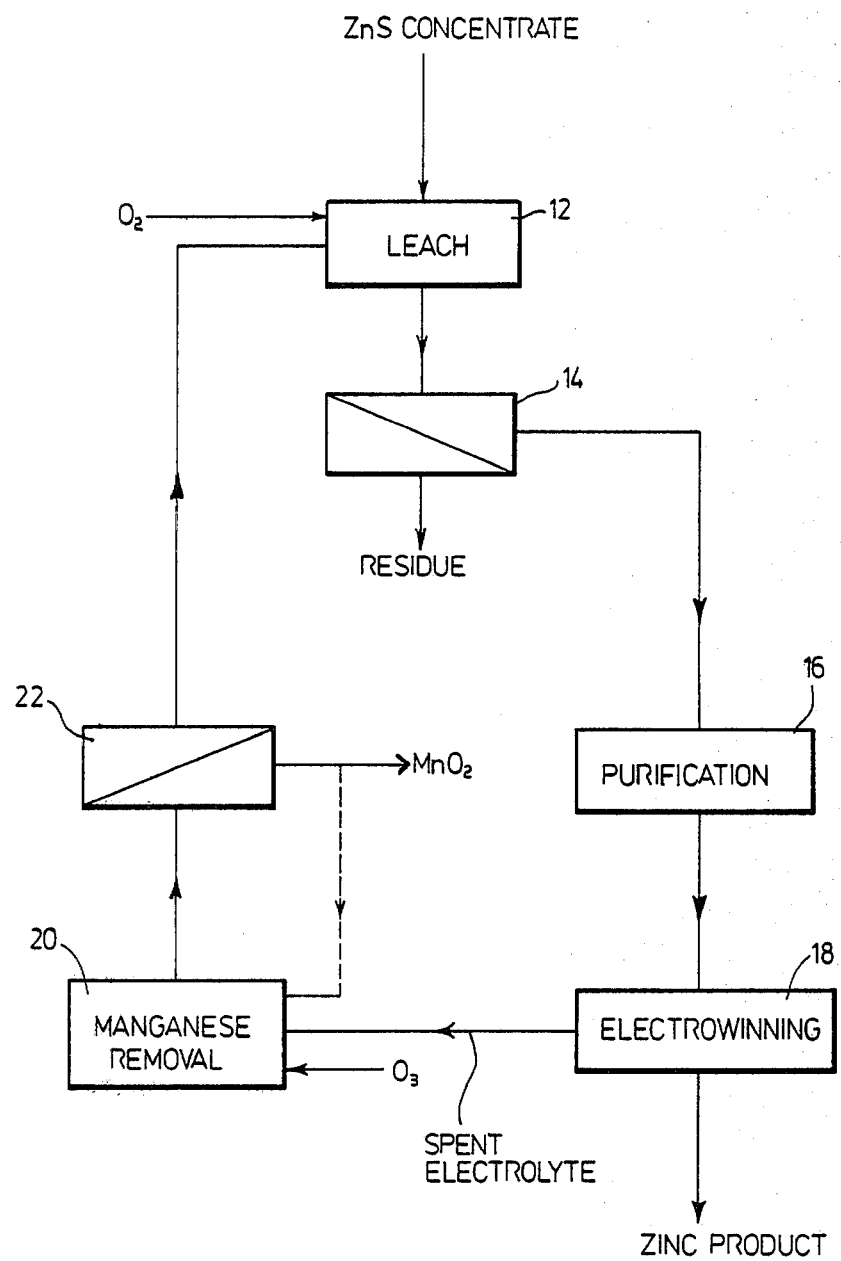

REMOVAL OF MANGANESE IONS FROM ZINC AND MANGANESE CONTAINING SOLUTIONS

This invention relates to the removal of manganese ions from aqueous acidic sulphate solutions which also contain zinc ions.

In many processes for the recovery of zinc, zinc containing material such as zinc concentrate is treated to produce aqueous acidic sulphate solution of a zinc salt, and this solution is electrolyzed to produce elemental zinc. Such treatment may include, for example, aqueous acid oxidation leaching of an unroasted zinc sulphide containing material. Processes of this kind are described in U.S. Pat. Nos. 2,996,440, 3,477,927 and 3,867,268. Other earlier processes include the oxidation roasting of zinc sulphide containing material, followed by aqueous acid leaching of the resulting oxidic calcine. These known processes have been satisfactory for treating material containing less than about 0.5% manganese since, although some of the manganese dissolves during the leaching step, normal losses of manganese in the process circuit prevent the manganese concentration from exceeding an undesirable value in the zinc solution to be electrolyzed.

Some dissolved manganese in the acidic zinc solution to be electrolyzed, for example up to about 5 grams per liter manganese, is not usually detrimental to the electrowinning step, and in fact may be beneficial by producing manganese dioxide at the anode of the electrolytic cell in which the electrowinning is carried out. When lead or lead containing anodes are used, the production of a layer of manganese dioxide on the anode reduces anode corrosion and reduces the amount of lead in the product zinc at the cathode.

Because of the discovery of a large amount of zinc containing ore which also contains an unusually high manganese content, it has now become desirable to extract zinc from zinc containing concentrate which has a relatively high manganese content, for example up to about 4% manganese or more. This means that the treatment of such zinc containing material by processes such as those referred to above will produce acidic zinc sulphate solutions containing a higher concentration of dissolved manganese (usually as manganous ions) than can be tolerated in the zinc electrowinning step. For example, up to about 95% of the manganese in the starting material may be dissolved in the leaching step, with the result that the concentration of dissolved manganese in the acidic zinc sulphate solution to be electrolyzed may significantly increase during the leaching step. As only a small portion of this manganese would normally be removed from the process by, for example, anodic oxidation during zinc electrowinning or in process bleed streams, and as the solution from zinc electrowinning is returned to the leaching step, a rapid build-up of dissolved manganese to an unacceptable level would occur. Therefore it is necessary to substantially reduce the concentration of manganese ions in the zinc sulphate solution at some point in the process to maintain an acceptable level of manganese ions.

Also, even if the zinc containing material does not contain a high amount of manganese, the extraction process may involve the addition of a manganese containing compound which produces an undesirably high concentration of manganese ions in the solution to be electrolyzed. For example, manganese dioxide may be added in the leach step to promote the oxidation of iron. Thus, in such process, it is also desirable to reduce the concentration of manganese ions in the zinc sulphate solution.

It is therefore an object of the invention to provide a process for removing manganese ions from aqueous acidic zinc sulphate solutions without removing a substantial amount of zinc ions from solution.

According to the present invention, manganese ions in an aqueous acid sulphate solution containing zinc ions are removed, without removing a substantial amount of zinc ions from solution, by treating the solution with ozone to oxidize manganese ions to manganese dioxide, which is insoluble and appears as a precipitate which can subsequently be removed in a liquid-solids separation step such as filtration.

In the past, ozone has been used in the treatment of water to reduce very small, but still unacceptable, concentrations of dissolved metals such as zinc and manganese to still lower concentrations to enable the water to meet pollution control standards required by various authorities. For example, industrial waste water containing about 0.45 gpl (grams per liter) manganese as dissolved manganous chloride and about 0.65 gpl zinc as dissolved zinc chloride has been treated at a pH of about 9 with ozone to precipitate at least about 95% of both the manganese and the zinc.

The present invention is quite different from such prior art, since the prior art is concerned with the simultaneous precipitation of as much dissolved manganese and zinc as possible. Further, the prior art has only been concerned with lowering still further very small concentrations of manganese and zinc in water which is neutral or slightly alkaline. Additionally, in such water, the manganese and zinc is present as dissolved manganous chloride and zinc chloride. In contrast, in the present invention, dissolved manganese is selectively precipitated, i.e. without substantial precipitation of dissolved zinc, from acidic sulphate solutions which contain relatively large amounts of dissolved manganese and zinc, for example from about 1 gpl to about 25 gpl manganese and from about 5 gpl to about 170 gpl zinc.

The solution treated with ozone may have a free acidity from about $10^{-5}$ molar to about 2.5 molar, preferably from about 0.1 molar to about 2 molar. In zinc recovery processes such as those referred to earlier, the spent electrolyte (that is to say the solution leaving the electrowinning step) usually contains sufficient acid to render the free acidity of the solution suitable for the manganese removal process according to the invention to be carried out on the spent electrolyte under preferred conditions. Further acid can of course be added if necessary. The spent electrolyte will usually contain, before the ozone treatment, from about 30 gpl to about 60 gpl zinc ions and from about 4 to about 12 gpl manganese ions. The free acidity of the solution entering the electrowinning step is usually about $10^{-3}$ molar or less. The manganese removal step of the present invention can if desired be carried out on this solution, i.e. before electrolysis, preferably with the free acidity first being raised by the addition of acid to a value within the preferred range.

The following reaction occurs when the solution is treated with ozone:

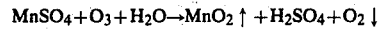

From the above equation, it will be seen that an advantage of using ozone to remove manganese ions from zinc sulphate solutions before electrowinning is that no undesirable residual compound is formed. Another advantage is that the ozone can be generated on site, as required, and does not have to be shipped in or stored before use.

The temperature of the solution during ozone treatment is preferably from about 20° C. to about 120° C. and more preferably from about 30° C. to about 40° C.

A preferred embodiment of the present invention will now be described, by way of example, with reference to the accompanying drawing, which is a diagrammatic view of a zinc extraction process.

Referring to the drawing, zinc sulphide concentrate is supplied, after suitable pre-treatment such as grinding, to an acid oxidation pressure leach step 12 in which the leaching medium is aqueous sulphuric acid solution, for example as described in U.S. Pat. No. 3,867,268, so that the following reaction takes place:

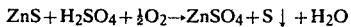

$$ZnS + H_2SO_4 + \tfrac{1}{2}O_2 \rightarrow ZnSO_4 + S \downarrow + H_2O$$

The products of the leach step 12 are then subjected to a liquid/solids separation step 14, from which the residue is discarded or treated for the recovery of contained values, with the product solution then being subjected to any necessary purification steps 16, the nature of which will be clear to a person skilled in the art. The solution is then passed to an electrowinning step 18 where zinc is deposited on the cathode. Zinc is removed from the cathode from time to time as zinc product, and the spent electrolyte is then treated with ozone in manganese removal step 20 in accordance with the present invention to precipitate a substantial amount of dissolved manganese as manganese dioxide. The ozone may be generated by conventional ozone-producing equipment which produces ozone-containing oxygen gas which is bubbled through the spent electrolyte.

The manganese dioxide precipitate is filtered off in a subsequent liquid/solids separation step 22 and the remaining solution is recycled to the leach step 12.

In one particular example, the zinc sulphide concentrate contained about 50% zinc and 3% manganese. After the leaching, purification and electrowinning steps, the solution entering the manganese removal step 20 contained about 43 gpl zinc and about 5 gpl manganese, and the sulphuric acid concentration of the solution was about 186 gpl, i.e. slightly less than 2 molar, the temperature being about 35° C. About 45 minutes after the introduction of ozone was commenced, sufficient manganese dioxide was precipitated to reduce the manganese concentration to about 0.35 gpl.

The manganese dioxide was precipitated as a black easily filterable solid which X-ray analysis showed to be a mixture of ($—MnO_2$ and $\gamma—MnO_2$. Very little zinc was precipitated by the ozone, with the result that the zinc concentration of the manganese dioxide precipitate was about 1.6%, while the manganese content was 55%.

The resulting manganese concentration in the solution passed to the leaching step 12 was consequently satisfactory for the subsequent zinc electrowinning step 22, even after additional manganese pick-up during the leaching step 12.

The manganese removal step 20 and related separation step 22 may if desired take place between the purification step 16 and the electrowinning step 18, with any desirable increase in free acidity being effected by recycling some of the spent electrolyte from the electrowinning step 18 to the manganese removal step 20.

The particle size and/or crystal structure of the manganese dioxide in the removal step 20 may be improved by recycling some of the manganese dioxide from the separation step 22 to the removal step 20, as indicated in dotted outline in the drawing. Such recycled manganese dioxide may for example be thickener underflow or unwashed filter cake from the separation step 22. although the described preferred embodiment is concerned with the extraction of zinc from unroasted zinc sulphide material by acid oxidation pressure leaching, it will be appreciated by a person skilled in the art that the invention is equally applicable to processes in which the oxidic calcine obtained by roasting zinc sulphide material is subjected to acid leaching with zinc subsequently being obtained by electrowinning from the leach solution.

Also, as indicated earlier, the invention is also applicable to zinc extraction processes in which a manganese containing compound, which may be manganese dioxide, is added to the leach step to promote the oxidation of iron present in the zinc-containing material.

Other embodiments and examples of the invention will of course be readily apparent to the person skilled in the art.

What we claim as new and desire to protect by Letters Patent of the United States is:

1. A process for removing manganese ions from an aqueous acidic sulphate solution containing zinc and manganese ions without removing a substantial amount of zinc ions from the solution, said solution having a free acidity of from about 0.1 molar to about 2 molar and containing from about 5 gpl to about 170 gpl zinc ions and from about 1 to about 25 gpl manganese ions, comprising treating the solution with ozone to oxidize manganese ions to manganese dioxide, and removing manganese dioxide from the solution.

2. A process according to claim 1 wherein, before ozone treatment, the solution contains from about 30 gpl to about 60 gpl zinc ions and from about 4 gpl to about 12 gpl manganese ions.

3. A process according to claim 1 wherein the temperature of the solution during ozone treatment is from about 20° C. to about 120° C.

4. A process according to claim 3 wherein the temperature of the solution during ozone treatment is from about 30° C. to about 40° C.

5. A process for recovering zinc from zinc-containing material which also contains manganese, comprising leaching the material in an aqueous sulphuric acid solution to produce an aqueous acidic sulphate solution containing dissolved zinc and manganese, electrolyzing the solution to produce elemental zinc at a cathode and a zinc and manganese containing acidic sulphate solution, said zinc and manganese containing acidic sulphate solution having a free acidity of from about 0.1 molar to about 2 molar and containing from about 30 gpl to about 60 gpl zinc ions and from about 4 gpl to about 12 gpl manganese ions, treating the zinc and manganese containing solution with ozone to oxidize manganese ions to manganese dioxide without removing a substantial amount of zinc ions, removing manganese dioxide from the solution, and returning solution from which manganese dioxide has been removed to the leach step.

* * * * *